United States Patent [19]
Ferren

[11] Patent Number: 5,029,008
[45] Date of Patent: Jul. 2, 1991

[54] APPARATUS FOR IDENTIFYING TELEVISION MONITORS

[76] Inventor: Bran Ferren, 615 Fireplace Rd., East Hampton, N.Y. 11937

[21] Appl. No.: 518,725

[22] Filed: May 4, 1990

[51] Int. Cl.⁵ ............................................ H04N 5/222
[52] U.S. Cl. .................................... 358/185; 362/23; 250/271
[58] Field of Search ...................... 358/185, 254, 110; 362/84, 23, 230; 250/271

[56] References Cited

U.S. PATENT DOCUMENTS

| | | | |
|---|---|---|---|
| 4,249,072 | 2/1981 | Buros | 250/271 |
| 4,368,979 | 1/1983 | Ruell | 250/271 |
| 4,485,308 | 11/1984 | Rabatin | 250/271 |
| 4,744,012 | 5/1988 | Bergkvist | 362/84 |

Primary Examiner—John W. Shepperd
Assistant Examiner—Sherrie Hsia
Attorney, Agent, or Firm—Darby & Darby

[57] ABSTRACT

In a television control room wherein a program director must observe a multiplicity of television monitors, the monitors are illuminated by ultraviolet light. The labels used to identify the input sources for the monitors may be made of an ultraviolet reflective material and the labeling indicia written in ultraviolet opaque ink. Alternatively, the label may be ultraviolet opaque and the ink ultraviolet reflective.

10 Claims, 1 Drawing Sheet

APPARATUS FOR IDENTIFYING TELEVISION MONITORS

This invention relates to a device for enabling a television program director to more easily identify the individual monitors of a large array of monitors in a television control room.

BACKGROUND OF THE INVENTION

In a television control room, there may be as many as one hundred television monitors (in the form of a "monitor wall") of which some are in color but most in black and white. The sizes of the monitors also may vary up to a typical maximum of thirty five inches. These individual monitors can receive inputs from a variety of sources such as tape machines and cameras. Because the monitors are not dedicated to specific inputs, it is necessary to identify the inputs for each monitor for each program. Typically, this is done by means of handwritten cards which are placed on or adjacent to each of the monitors.

Ideally, in order to enhance the viewing of the monitors, the room in which the program director observes the monitors should be as dark as possible. However, if the room is too dark, it is difficult for the program director to read the labels on the individual monitors in which case he or she does not know where the feed for the monitors is from.

Hence, there exists a need to label the individual monitors in a television control room in such a way that the monitors can be viewed in darkness, and the labels easily read by the program director so that each monitor can be easily identified.

SUMMARY OF THE INVENTION

In accordance with the invention, ultraviolet lamps are located in the control room and adapted to "illuminate" the monitor wall. The labels may be made from cards that fluoresce under ultraviolet light so that anything written on the card in non-reflective ink is shown in relief. Conversely, the label may be written on a non-fluorescent card in an ultraviolet fluorescent ink or both. When a monitor is labeled with a card so inscribed, it is easily identified in a dark room.

THE DRAWINGS

FIG. 1 is a front schematic view of an array of monitors identified according to the invention; and FIG. 2 is a section view along the line 2—2 of FIG. 1.

DETAILED DESCRIPTION

Figure 1:
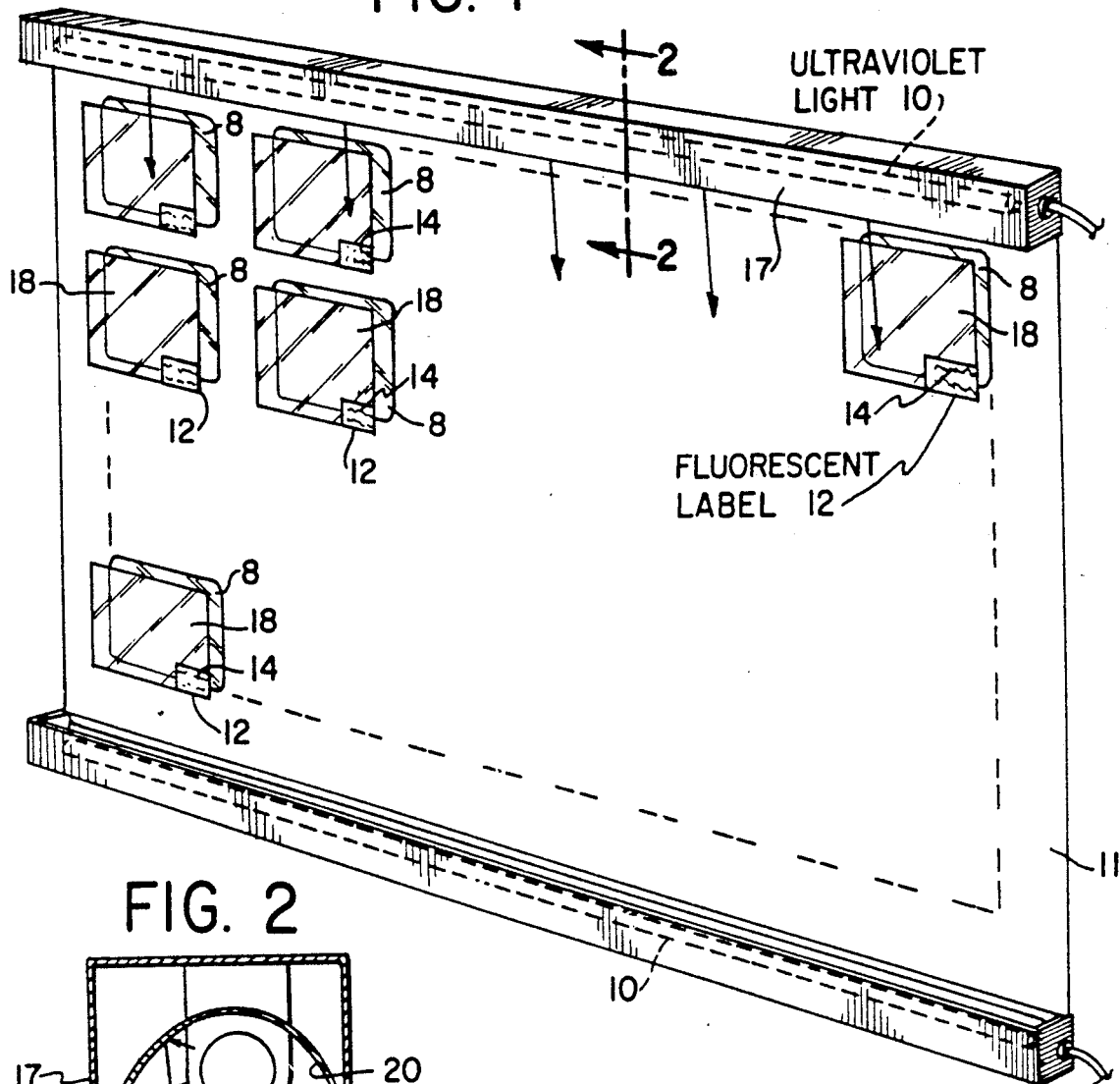
Figure 2:
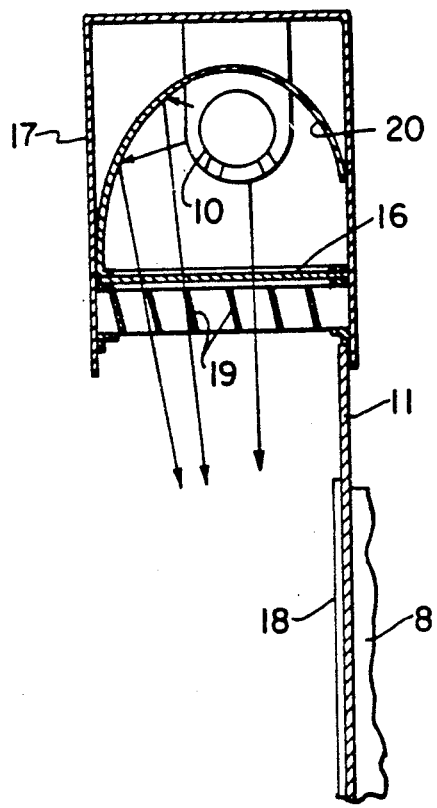

As shown in the drawings, a television control room wall will include an array of television monitors 8. Typically, there may be up to one hundred monitors or more with different feeds for the monitors. Each of the monitors must be labeled so that the program director can see at a glance exactly what is being viewed on the various monitors. The monitors 8 are typically mounted to form a monitor wall. A supporting bezzel 11 is provided around each monitor 8 to block any light emitted from behind the monitor wall and, in accordance with the invention, to support individual filters in front of each monitor (as described below).

In accordance with the invention, ultraviolet lamps 10 are positioned in the control room to illuminate the monitors 8. The lamps 10 are preferably in the form of linear tubes and are positioned along the upper and lower horizontal edges of the monitor wall.

The information required to identify the monitors may be written on a card (or label) 12 made of a material which will fluoresce under ultraviolet light. For example, due to the incorporation of "whitening" agents, conventional white card stock very often fluoresces at near ultraviolet wavelengths and glows when illuminated by ultraviolet light. If such a card is used, the identification of the monitor may be written on the card in a non-fluorescent ink 14 (e.g., black ink) which does not fluoresce in ultraviolet light. The information written on the card will thus appear in relief when the card 12 and monitor 10 are illuminated by the ultraviolet light.

Conversely, a non-ultraviolet fluorescent card or other label can be used and the information written in a white or other ultraviolet fluorescent ink that will glow when illuminated by the ultraviolet wavelengths. Also, a fluorescent card material of one particular color may be used with information written in a fluorescent ink having a contrasting color.

Some care has to be taken with the ultraviolet lamps 10. Inexpensive ultraviolet lamps may generate short-wave ultraviolet wavelengths which can be harmful to the eye. They may also emit violet light which is in the visible band and would tend to affect the viewing of the monitors. Accordingly, a bandpass filter 16 may be placed in front of the ultraviolet lamps to permit only the desired invisible ultraviolet wavelengths to illuminate the monitors. It is also preferred that the output of the lamps 10 be directed at the monitors at a low angle with respect to the surface of the monitors so that any visible light (such as a purple hue) being emitted from the lamps 10 (that is not blocked by the filter 16) does not produce glare or related distracting reflections from the surface of each monitor. A dimmer (not shown) may be provided to vary the brightness.

Each ultraviolet light source is preferably enclosed in an appropriate opaque housing 17. A reflector 20 is positioned within the housing 17 around the lamp 10 to direct the ultraviolet light towards the monitors, through an opening in the housing. The shape of the reflector 20 may be altered to direct the output light as desired, using for example, a parabolic or elipsoidal reflector. To further direct the output light to individual monitors and prevent direct exposure to the operators of the control room, louvers 19 may be positioned at the output and individually controlled as necessary. The louvers 19 may also provide control of the intensity of ultraviolet light emitted from the lamps.

The ultraviolet light may cause the phosphor of conventional monitors to fluoresce. This may be objectionable to the people in the control room and can be avoided by placing in front of the monitors a filter which includes ultraviolet absorbers. Conventional transparent acrylic sheets (such as UF-3, manufactured by Rohm & Haas, Inc. of Phillidelfia, Pa. or OP-2, manufactured by Cyro Industries of Orange, Conn.) are available which include such absorbers. This sheet may also include an anti-reflecting coating to further minimize distracting reflections from the surface of the filter.

I claim:

1. A method of identifying selected monitors of an array of monitors forming a monitor wall in a television control room, comprising the steps of:

illuminating the monitor wall with ultraviolet light; and placing a label on each selected monitor to be identified, the label including portions which fluoresce under ultraviolet light.

2. A method according to claim 1, further including the step of placing a visually transparent ultraviolet absortive filter in front of the monitors to be identified to prevent the monitors from fluorescing.

3. A method according to claim 1, further including the step of writing on said fluorescent portions of said label with an ink that does not fluoresce under ultraviolet light.

4. A method according to claim 1, including the step of writing on a label that is non-fluorescent under ultraviolet light with an ink that is fluorescent under ultraviolet light.

5. A method according to claim 1, including the step of writing on a label that is fluorescent under ultraviolet light with ink that is also fluorescent under ultraviolet light.

6. In a television control room, the combination comprising:

a multiplicity of television monitors;

a source of ultraviolet light for illuminating said monitors; and labels on selected ones of said monitors, said labels including written indicia thereon with the background of the label or the written indicia or both being fluorescent under ultraviolet light.

7. Apparatus according to claim 6, wherein both said background of said label and said written indicia is fluorescent under ultraviolet light.

8. Apparatus according to claim 6, including an ultraviolet blocking filter positioned between each of said monitors and said labels.

9. Apparatus according to claim 6, further including means for blocking the ultraviolet light from the occupants of the control room.

10. Apparatus according to claim 6, further including means for blocking undesireable short wavelength light and visible light from the output of the source of ultraviolet light.

* * * * *